(12) United States Patent
Broderick et al.

(10) Patent No.: US 11,339,266 B2
(45) Date of Patent: May 24, 2022

(54) COMPOSITION, FOAMED SILICONE ELASTOMER FORMED THEREFROM, AND METHODS OF FORMATION

(71) Applicants: DOW SILICONES CORPORATION, Midland, MI (US); DOW GLOBAL TECHNOLOGIES LLC, Midland, MI (US)

(72) Inventors: Adam H. Broderick, Midland, MI (US); Douglas A. Brune, Midland, MI (US); Jarred Cramton, Midland, MI (US); Mark D. Fisher, Midland, MI (US); Jody J. Henning, Midland, MI (US); Mark F. Sonnenschein, Midland, MI (US); Kai Su, Midland, MI (US); Benjamin L. Wendt, Midland, MI (US)

(73) Assignees: DOW SILICONES CORPORATION, Midland, MI (US); DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 17/264,557

(22) PCT Filed: Jul. 30, 2019

(86) PCT No.: PCT/US2019/044039
§ 371 (c)(1),
(2) Date: Jan. 29, 2021

(87) PCT Pub. No.: WO2020/028299
PCT Pub. Date: Feb. 6, 2020

(65) Prior Publication Data
US 2021/0317281 A1    Oct. 14, 2021

Related U.S. Application Data

(60) Provisional application No. 62/712,385, filed on Jul. 31, 2018.

(51) Int. Cl.
| | | |
|---|---|---|
| *C08J 9/16* | (2006.01) | |
| *C08J 9/14* | (2006.01) | |
| *C08G 77/08* | (2006.01) | |
| *C08G 77/12* | (2006.01) | |
| *C08G 77/16* | (2006.01) | |
| *C08G 77/20* | (2006.01) | |

(Continued)

(52) U.S. Cl.
CPC ............. *C08J 9/146* (2013.01); *C08G 77/08* (2013.01); *C08G 77/12* (2013.01); *C08G 77/16* (2013.01); *C08G 77/20* (2013.01); *C08J 9/0061* (2013.01); *C08J 9/06* (2013.01); *C08J 9/16* (2013.01); *C08J 2203/12* (2013.01); *C08J 2203/142* (2013.01); *C08J 2203/18* (2013.01); *C08J 2205/04* (2013.01); *C08J 2383/05* (2013.01); *C08J 2383/06* (2013.01); *C08J 2383/07* (2013.01)

(58) Field of Classification Search
CPC ... C08J 9/146; C08J 9/0061; C08J 9/06; C08J 9/16; C08J 2383/07; C08J 2203/18; C08J 2203/12; C08J 2205/04; C08J 2383/06; C08J 2383/05; C08J 2203/142; C08G 77/08; C08G 77/12; C08G 77/20; C08G 77/16

See application file for complete search history.

(56) References Cited

U.S. PATENT DOCUMENTS

| | | |
|---|---|---|
| 3,159,601 A | 12/1964 | Ashley |
| 3,220,972 A | 11/1965 | Lamoreaux |

(Continued)

FOREIGN PATENT DOCUMENTS

| | | |
|---|---|---|
| CN | 1483059 A | 3/2004 |
| CN | 106380855 A | 2/2017 |
| EP | 1029888 A1 | 8/2000 |
| EP | 3135304 A1 | 3/2004 |
| JP | 2001114899 A | 4/2001 |
| TW | 455624 B | 9/2001 |
| WO | 1999024500 A1 | 5/1999 |
| WO | 2012032231 A1 | 3/2012 |

OTHER PUBLICATIONS

Zyhowski, et al., "An Overview Of The Properties And Applications of HFC-245fa" (2002). International Refrigeration and Air Conditioning Conference. Paper 559. http://docs.lib.purdue.edu/iracc/559 (Year: 2002).*

(Continued)

*Primary Examiner* — Irina S Zemel
(74) *Attorney, Agent, or Firm* — Warner Norcross + Judd LLP

(57) ABSTRACT

A composition for forming a foamed silicone elastomer is disclosed. The composition comprises: A) an organopolysiloxane having at least two silicon-bonded ethylenically unsaturated groups per molecule; B) an organohydrogensiloxane having at least two silicon-bonded hydrogen atoms per molecule; C) a hydrosilylation catalyst; D) a chemical blowing agent; and E) a physical blowing agent. The hydrosilylation catalyst C) is present in a catalytically effective amount. The chemical blowing agent D) has at least one hydroxyl (OH) group, and is present in an amount to provide a OH content >0 and <500 parts per million (ppm). The physical blowing agent E) undergoes a phase change from a liquid to a gaseous state during exposure to atmospheric pressure and a temperature ≥0° C. The blowing agents D) and E) are different from one another. A foamed silicone elastomer, and methods of forming the composition and foamed silicone elastomer are also disclosed.

19 Claims, 1 Drawing Sheet

(51) Int. Cl.
*C08J 9/00* (2006.01)
*C08J 9/06* (2006.01)

(56) References Cited

U.S. PATENT DOCUMENTS

| | | |
|---|---|---|
| 3,296,291 A | 1/1967 | Chalk et al. |
| 3,419,593 A | 12/1968 | Willing |
| 3,516,946 A | 1/1970 | Modic |
| 3,715,334 A | 2/1973 | Karstedt |
| 3,814,730 A | 6/1974 | Karstedt |
| 3,923,705 A | 12/1975 | Smith |
| 3,928,629 A | 12/1975 | Chandra et al. |
| 3,989,668 A | 11/1976 | Lee et al. |
| 4,026,845 A | 5/1977 | Kim et al. |
| 4,490,488 A | 12/1984 | Cush |
| 4,550,125 A | 10/1985 | Lee et al. |
| 4,808,634 A | 2/1989 | Uriarte et al. |
| 5,036,117 A | 7/1991 | Chung et al. |
| 5,175,325 A | 12/1992 | Brown et al. |
| 5,574,073 A | 11/1996 | Juen et al. |
| 5,744,507 A | 4/1998 | Angell et al. |
| 6,084,002 A * | 7/2000 | Nicholson ............... C08J 9/0066 521/91 |
| 6,200,581 B1 | 3/2001 | Lin et al. |
| 6,476,080 B2 | 11/2002 | Duffy et al. |
| 6,605,734 B2 | 8/2003 | Roy et al. |
| 7,842,848 B2 | 11/2010 | Janusson et al. |
| 9,056,953 B2 | 6/2015 | Blanc et al. |
| 2002/0132868 A1 | 9/2002 | Duffy et al. |
| 2008/0214688 A1 | 9/2008 | Hirabayashi et al. |
| 2010/0003484 A1 | 1/2010 | Blanc et al. |
| 2013/0310781 A1 | 11/2013 | Phillips et al. |
| 2014/0024731 A1 | 1/2014 | Blanc et al. |
| 2015/0126307 A1* | 5/2015 | Comeau ............. A63B 37/0076 473/376 |
| 2016/0197025 A1 | 7/2016 | Bhagwagar et al. |
| 2019/0001019 A1 | 1/2019 | Lindgren et al. |

OTHER PUBLICATIONS

Machine assisted English translation of CN106380855A obtained from https://patents.google.com on Feb. 23, 2021, 7 pages.
International Search Report for PCT/US2019/044039 dated Sep. 26, 2019, 4 pages.
Machine assisted English translation of JP2001114899A obtained from https://patents.google.com/patent on Oct. 11, 2021, 13 pages.

* cited by examiner

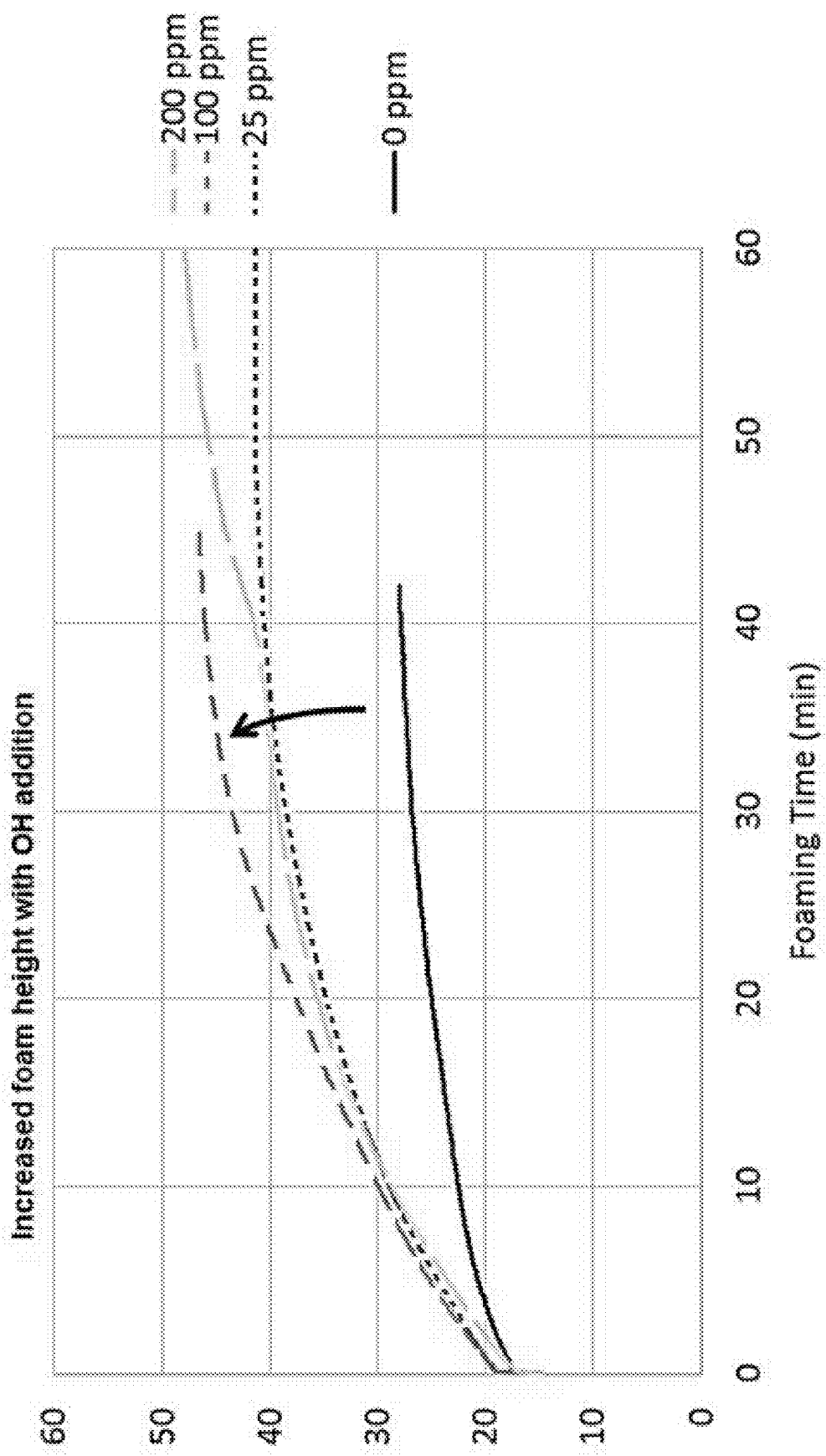

COMPOSITION, FOAMED SILICONE ELASTOMER FORMED THEREFROM, AND METHODS OF FORMATION

CROSS-REFERENCE TO RELATED APPLICATIONS

This application is the U.S. National Stage of International Application No. PCT/US2019/044039 filed on 30 Jul. 2019, which claims priority to and all advantages of U.S. Provisional Application No. 62/712,385 filed on 31 Jul. 2018, the content of which is incorporated herein by reference.

FIELD OF THE INVENTION

This disclosure relates to compositions for forming foamed silicone elastomers, and in particular, to compositions comprising a combination of chemical and physical blowing agents, to foamed silicone elastomers formed from such compositions, and to methods of making such compositions and foamed silicone elastomers. Generation of hydrogen gas during formation of the foamed silicone elastomers is minimized while still providing desirable foam properties, such as lower density, higher thermal resistance, etc.

DESCRIPTION OF THE RELATED ART

Room temperature vulcanization (RTV) silicone foams are almost exclusively chemically blown using the dehydrocondensation reaction between silicone hydride and hydroxyl-functional components. Specifically, hydrogen gas is generated via reaction of Si—H and Si—OH groups, which foams the RTV reaction mixture.

In some cases, however, generation of hydrogen gas can be problematic due to flammability concerns. For example, the presence of hydrogen gas at concentrations between the lower and upper explosion limits (LEL and UEL) in an environment where sparks or high heat could be present is hazardous.

An alternate blowing mechanism to form silicone foams involves the application of heat to facilitate foaming. In some situations, heating to foam and cure the silicone polymer is undesirable, and an RTV solution is preferred. This presents the aforementioned hazard potential. While hydrogen gas generation may not always be problematic, conventional blowing mechanisms (such as hydrogen blown RTV silicone foams) do not have desirable physical properties for certain applications.

In view of the foregoing, there remains an opportunity to provide improved compositions for forming foamed silicone elastomers. There also remains an opportunity to provide improved foamed silicone elastomers, and improved methods of forming such compositions and foams.

SUMMARY OF THE INVENTION

This disclosure relates to a composition for forming a foamed silicone elastomer (referred to herein as the "composition"). The composition comprises: A) an organopolysiloxane having at least two silicon-bonded ethylenically unsaturated groups per molecule; B) an organohydrogensiloxane having at least two silicon-bonded hydrogen atoms per molecule; C) a hydrosilylation catalyst; D) a chemical blowing agent; and E) a physical blowing agent.

The hydrosilylation catalyst C) is present in a catalytically effective amount. Thus, the composition is generally classified as a hydrosilylation reaction composition, and the foam is cured via hydrosilylation reaction of at least components A) and B). The chemical blowing agent D) has at least one hydroxyl (OH) group, and is present in an amount to provide a OH content >0 and <500 parts per million (ppm). The physical blowing agent E) undergoes a phase change from a liquid to a gaseous state during exposure to atmospheric pressure and a temperature ≥0° C. The blowing agents D) and E) are different from one another. During cure, the blowing agents D) and E) blow the reaction mixture of the composition to form the foam.

This disclosure also relates to a foamed silicone elastomer (referred to herein as the "foam," "foamed elastomer," or "elastomer"). As alluded to above, the foam comprises the reaction product of the composition. In various embodiments, the foam comprises the reaction product of components A) and B), formed in the presence of components C), D), and E). In further embodiments, the reaction product also comprises at least a portion of component D). The reaction product may also be formed in the presence of one or more optional additives. Such additives, if utilized, may be inert to, or reactive with, other components of the composition.

In the composition of this disclosure—and relative to conventional RTV silicone compositions that rely on hydrogen gas for foaming—a majority (to all) of the hydrogen gas used for blowing is replaced with the physical blowing agent E) to form the foam of this disclosure. Thus, in many embodiments, component E) is the majority blowing agent on a parts by weight basis. In various embodiments, component E) is classified as a liquid blowing agent (LBA), which undergoes a phase change at the temperature of foam formation or application. In general, component D) is an auxiliary or supplement blowing agent. Thus, in many embodiments, component D) is the minority blowing agent on a parts by weight basis. However, it was discovered that the inclusion of component D) provides new and unexpected results.

Specifically, it was discovered that excluding a majority (to all) of the hydroxyl-functional components of the composition (such as those typically used in RTV silicone systems), and blending in component E) produced a foam, at room temperature, with a desirable density, pore size, and pore size distribution. Surprisingly, however, it was discovered that inclusion of a small amount of component D) significantly decreased the density of the foam, while producing only a minimum quantity of hydrogen gas. It is thought that the benefit of a substantial reduction in foam density far outweighs a minimal (if not negligible) increase in hydrogen gas generation. This is described in greater detailed further below, and generally illustrated in FIG. 1.

BRIEF DESCRIPTION OF THE DRAWING(S)

FIG. 1 is a line graph illustrating foam rise profiles for comparative and inventive compositions without and with varied amounts of added OH content (via component D), e.g. benzyl alcohol).

DETAILED DESCRIPTION OF THE INVENTION

As used herein, the term "ambient temperature" or "room temperature" refers to a temperature between about 20° C. and about 30° C. Usually, room temperature ranges from about 20° C. to about 25° C. The term "ambient pressure" or "atmospheric pressure" refers to a pressure of about 101 kPa.

All viscosity measurements referred to herein were measured at 25° C. unless otherwise indicated. Viscosity can be determined via methods understood in the art. The following abbreviations have these meanings herein: "Me" means methyl, "Et" means ethyl, "Pr" means propyl, "Bu" means butyl, "g" means grams, and "ppm" means parts per million.

"Hydrocarbyl" means a monovalent hydrocarbon group which may be substituted or unsubstituted. Specific examples of hydrocarbyl groups include alkyl groups, alkenyl groups, alkynyl groups, aryl groups, aralkyl groups, etc.

"Alkyl" means an acyclic, branched or unbranched, saturated monovalent hydrocarbon group. Alkyl is exemplified by, but not limited to, Me, Et, Pr (e.g. iso-Pr and/or n-Pr), Bu (e.g. iso-Bu, n-Bu, tert-Bu, and/or sec-Bu), pentyl (e.g. iso-pentyl, neo-pentyl, and/or tert-pentyl), hexyl, heptyl, octyl, nonyl, decyl, undecyl, and dodecyl as well as branched saturated monovalent hydrocarbon groups of 6-12 carbon atoms. Alkyl groups may have 1-30, alternatively 1-24, alternatively 1-20, alternatively 1-12, alternatively 1-10, and alternatively 1-6, carbon atoms.

"Alkenyl" means an acyclic, branched or unbranched, monovalent hydrocarbon group having one or more carbon-carbon double bonds. Alkenyl is exemplified by, but not limited to, vinyl, allyl, methallyl, propenyl, and hexenyl. Alkenyl groups may have 2-30, alternatively 2-24, alternatively 2-20, alternatively 2-12, alternatively 2-10, and alternatively 2-6, carbon atoms.

"Alkynyl" means an acyclic, branched or unbranched, monovalent hydrocarbon group having one or more carbon-carbon triple bonds. Alkynyl is exemplified by, but not limited to, ethynyl, propynyl, and butynyl. Alkynyl groups may have 2-30, alternatively 2-24, alternatively 2-20, alternatively 2-12, alternatively 2-10, and alternatively 2-6, carbon atoms.

"Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5-9, alternatively 6-7, and alternatively 5-6, carbon atoms. Polycyclic aryl groups may have 10-17, alternatively 10-14, and alternatively 12-14, carbon atoms.

"Aralkyl" means an alkyl group having a pendant and/or terminal aryl group or an aryl group having a pendant alkyl group. Exemplary aralkyl groups include tolyl, xylyl, mesityl, benzyl, phenylethyl, phenyl propyl, and phenyl butyl.

"Alkenylene" means an acyclic, branched or unbranched, divalent hydrocarbon group having one or more carbon-carbon double bonds. "Alkylene" means an acyclic, branched or unbranched, saturated divalent hydrocarbon group. "Alkynylene" means an acyclic, branched or unbranched, divalent hydrocarbon group having one or more carbon-carbon triple bonds. "Arylene" means a cyclic, fully unsaturated, divalent hydrocarbon group.

"Carbocycle" and "carbocyclic" each mean a hydrocarbon ring. Carbocycles may be monocyclic or alternatively may be fused, bridged, or spiro polycyclic rings. Monocyclic carbocycles may have 3-9, alternatively 4-7, and alternatively 5-6, carbon atoms. Polycyclic carbocycles may have 7-17, alternatively 7-14, and alternatively 9-10, carbon atoms. Carbocycles may be saturated or partially unsaturated.

"Cycloalkyl" means a saturated carbocycle. Monocyclic cycloalkyl groups are exemplified by cyclobutyl, cyclopentyl, and cyclohexyl. "Cycloalkylene" means a divalent saturated carbocycle.

The term "substituted" as used in relation to another group, e.g. a hydrocarbyl group, means, unless indicated otherwise, one or more hydrogen atoms in the hydrocarbyl group has been replaced with another substituent. Examples of such substituents include, for example, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amines, amino-functional groups, amido-functional groups, and cyano-functional groups; sulphur atoms; and sulphur atom containing groups such as mercapto groups.

M, D, T and Q units are generally represented as $R_u SiO_{(4-u)/2}$, where u is 3, 2, 1, and 0 for M, D, T, and Q, respectively, and R is an independently selected hydrocarbyl group. The M, D, T, Q designate one (Mono), two (Di), three (Tri), or four (Quad) oxygen atoms covalently bonded to a silicon atom that is linked into the rest of the molecular structure.

Component A)

Component A) includes at least two aliphatically unsaturated group per molecule, which may alternatively be referred to as ethylenic unsaturation. Component A) is not limited and may be any unsaturated compound having at least two aliphatically unsaturated groups. In various embodiments, component A) has at least three silicon-bonded ethylenically unsaturated groups per molecule. In certain embodiments, component A) comprises a siloxane. In other embodiments, component A) comprises a silicone-organic hybrid, or an organosilicon compound. Various embodiments and examples of component A) are disclosed below.

The aliphatically unsaturated groups of component A) may be terminal, pendent, or in both locations in component A). For example, the aliphatically unsaturated group may be an alkenyl group and/or an alkynyl group. Alkenyl groups are exemplified by, but not limited to, vinyl, allyl, propenyl, and hexenyl. Alkynyl is exemplified by, but not limited to, ethynyl, propynyl, and butynyl.

In certain embodiments, component A) comprises an organopolysiloxane of the following average formula:

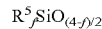

$$R^5_f SiO_{(4-f)/2}$$

wherein each $R^5$ is an independently selected substituted or unsubstituted hydrocarbyl group with the proviso that in each molecule, at least two $R^5$ groups are aliphatically unsaturated groups, and wherein f is selected such that $0<f\leq 3.2$.

The average formula above for the organopolysiloxane may be alternatively written as $(R^5_3 SiO_{1/2})_w (R^5_2 SiO_{2/2})_x (R^5 SiO_{3/2})_y (SiO_{4/2})_z$, where $R^5$ and its proviso is defined above, and w, x, y, and z are independently from $\geq 0$ to $\leq 1$, with the proviso that w+x+y+z=1. One of skill in the art understands how such M, D, T, and Q units and their molar fractions influence subscript f in the average formula above. T and Q units, indicated by subscripts y and z, are typically present in silicone resins, whereas D units, indicated by subscript x, are typically present in silicone polymers (and may also be present in silicone resins).

Each $R^5$ is independently selected, as introduced above, and may be linear, branched, cyclic, or combinations thereof. Cyclic hydrocarbyl groups encompass aryl groups as well as saturated or non-conjugated cyclic groups. Aryl groups may be monocyclic or polycyclic. Linear and branched hydrocarbyl groups may independently be saturated or unsaturated. One example of a combination of a linear and cyclic hydrocarbyl group is an aralkyl group. Examples of substituted and unsubstituted hydrocarbyl groups are introduced above relative to R. Examples of aliphatically unsaturated group(s) are also introduced above.

In certain embodiments, the organopolysiloxane is substantially linear, alternatively is linear. In these embodiments, the substantially linear organopolysiloxane may have the average formula:

wherein each $R^5$ and its proviso are defined above, and wherein f' is selected such that $1.9 \leq f' \leq 2.2$.

In these embodiments, at a temperature of 25° C., the substantially linear organopolysiloxane is typically a flowable liquid or is in the form of an uncured rubber. Generally, the substantially linear organopolysiloxane has a viscosity of from 10 to 30,000,000 mPa·s, alternatively from 10 to 10,000,000 mPa·s, alternatively from 100 to 1,000,000 mPa·s, alternatively from 100 to 100,000 mPa·s, at 25° C. Viscosity may be measured at 25° C. via a Brookfield LV DV-E viscometer, as understood in the art.

In specific embodiments in which the organopolysiloxane is substantially linear or linear, the organopolysiloxane may have the average formula:

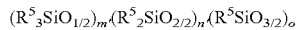

wherein each $R^5$ is independently selected and defined above (including the proviso that in each molecule, at least two $R^5$ groups are aliphatically unsaturated groups), and m'≥2, n'≥2, and o≥0. In specific embodiments, m' is from 2 to 10, alternatively from 2 to 8, alternatively from 2 to 6. In these or other embodiments, n' is from 2 to 1,000, alternatively from 2 to 500, alternatively from 2 to 200. In these or other embodiments, o is from 0 to 500, alternatively from 0 to 200, alternatively from 0 to 100.

When the organopolysiloxane is substantially linear, alternatively is linear, the silicon-bonded aliphatically unsaturated groups may be pendent, terminal or in both pendent and terminal locations. As a specific example of the organopolysiloxane having pendent silicon-bonded aliphatically unsaturated groups, the organopolysiloxane may have the average formula:

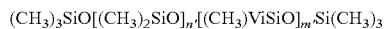

where n' and m' are defined above, and Vi indicates a vinyl group. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Alternatively, as a specific example of the organopolysiloxane having terminal silicon-bonded aliphatically unsaturated groups, the organopolysiloxane may have the average formula:

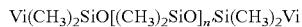

where n' and Vi are defined above. The dimethyl polysiloxane terminated with silicon-bonded vinyl groups may be utilized alone or in combination with the dimethyl, methylvinyl polysiloxane disclosed immediately above. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Because the at least two silicon-bonded aliphatically unsaturated groups may be both pendent and terminal, component A) may have the average formula:

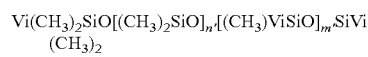

where n', m' and Vi are defined above.

The substantially linear organopolysiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

In these or other embodiments, component A) may be a resinous organopolysiloxane. In these embodiments, the resinous organopolysiloxane may have the average formula:

wherein each $R^5$ and its provisos are defined above, and wherein f" is selected such that $0.5 \leq f'' \leq 1.7$.

The resinous organopolysiloxane has a branched or a three dimensional network molecular structure. At 25° C., the resinous organopolysiloxane may be in a liquid or in a solid form, optionally dispersed in a carrier, which may solubilize and/or disperse the resinous organopolysiloxane therein.

In specific embodiments, the resinous organopolysiloxane may be exemplified by an organopolysiloxane that comprises only T units, an organopolysiloxane that comprises T units in combination with other siloxy units (e.g. M, D, and/or Q siloxy units), or an organopolysiloxane comprising Q units in combination with other siloxy units (i.e., M, D, and/or T siloxy units). Typically, the resinous organopolysiloxane comprises T and/or Q units. A specific example of the resinous organopolysiloxane is a vinyl-terminated silsesquioxane.

The organopolysiloxane may comprise a combination or mixture of different organopolysiloxanes, including those of different structures. In certain embodiments, component A) comprises one or more linear organopolysiloxanes as a majority component.

Component B)

Component B) includes at least two silicon-bonded hydrogen atoms per molecule. In various embodiments, component B) has at least three silicon-bonded hydrogen atoms per molecule. Component B) can be linear, branched, cyclic, resinous, or have a combination of such structures. In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms.

In certain embodiments, component B) is of formula $R^8_{4-s}SiH_s$, where $R^8$ is independently selected and may be any silicon-bonded group, and s is selected such that $1 \leq s \leq 4$. Typically, s is 1, 2, or 3, alternatively 1 or 2. Each $R^8$ is typically independently a substituted or unsubstituted hydrocarbyl group. However, $R^8$ can be any silicon-bonded group so long as component B) is still capable of undergoing hydrosilylation via its silicon-bonded hydrogen atoms. For example, $R^8$ can be a halogen. When component B) is a silane compound, component B) can be a monosilane, disilane, trisilane, or polysilane.

In these or other embodiments, component B) may be an organosilicon compound of formula: $H_{g'}R^9_{3-g'}Si—R^{10}—SiR^9_2H$, wherein each $R^9$ is an independently selected substituted or unsubstituted hydrocarbyl group, g' is 0 or 1, and $R^{10}$ is a divalent linking group. $R^{10}$ may be a siloxane chain (including, for example, —$R^9_2SiO$—, —$R^9HSiO$—, and/or —$H_2SiO$— D siloxy units) or may be a divalent hydrocarbon group. Typically, the divalent hydrocarbon group is free of aliphatic unsaturation. The divalent hydrocarbon group may be linear, cyclic, branched, aromatic, etc., or may have combinations of such structures.

In these or other embodiments, component B) comprises an organohydrogensiloxane, which can be a disiloxane, trisiloxane, or polysiloxane. Examples of organohydrogensiloxanes suitable for use as component B) include, but are not limited to, siloxanes having the following formulae: $PhSi(OSiMe_2H)_3$, $Si(OSiMe_2H)_4$, $MeSi(OSiMe_2H)_3$, and $Ph_2Si(OSiMe_2H)_2$, wherein Me is methyl, and Ph is phenyl. Additional examples of organohydrogensiloxanes that are suitable for purposes of component B) include 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), and a dimethylhydrogensiloxy-terminated poly(methylhydrogensiloxane).

When component B) comprises an organohydrogensiloxane, component B) may comprise any combination of M, D, T and/or Q siloxy units, so long as component B) includes at least two silicon-bonded hydrogen atoms. These siloxy units can be combined in various manners to form cyclic, linear, branched and/or resinous (three-dimensional networked) structures. Component B) may be monomeric, polymeric, oligomeric, linear, branched, cyclic, and/or resinous depending on the selection of M, D, T, and/or Q units.

Because component B) includes at least two silicon-bonded hydrogen atoms, with reference to the siloxy units set forth above, component B) may comprise any of the following siloxy units including silicon-bonded hydrogen atoms, optionally in combination with siloxy units which do not include any silicon-bonded hydrogen atoms: $(R^9_2HSiO_{1/2})$, $(R^9H_2SiO_{1/2})$, $(H_3SiO_{1/2})$, $(R^9HSiO_{2/2})$, $(H_2SiO_{2/2})$, and/or $(HSiO_{3/2})$, where $R^9$ is independently selected and defined above.

In specific embodiments, for example when component B) is linear, component B) may have the average formula:

wherein each $R^{11}$ is independently hydrogen or $R^9$, each $R^9$ is independently selected and defined above, and $e'' \geq 2$, $f''' \geq 0$, and $g'' \geq 2$. In specific embodiments, e'' is from 2 to 10, alternatively from 2 to 8, alternatively from 2 to 6. In these or other embodiments, f''' is from 0 to 1,000, alternatively from 1 to 500, alternatively from 1 to 200. In these or other embodiments, g'' is from 2 to 500, alternatively from 2 to 200, alternatively from 2 to 100.

In one embodiment, component B) is linear and includes two or more pendent silicon-bonded hydrogen atoms. In these embodiments, component B) may be a dimethyl, methyl-hydrogen polysiloxane having the average formula;

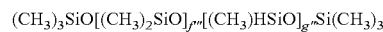

where f''' and g'' are defined above.

In these or other embodiments, component B) is linear and includes terminal silicon-bonded hydrogen atoms. In these embodiments, component B) may be an SiH terminal dimethyl polysiloxane having the average formula:

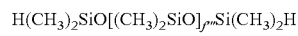

where f''' is as defined above. The SiH terminal dimethyl polysiloxane may be utilized alone or in combination with the dimethyl, methyl-hydrogen polysiloxane disclosed immediately above. Further, the SiH terminal dimethyl polysiloxane may have one trimethylsiloxy terminal such that the SiH terminal dimethyl polysiloxane may have only one silicon-bonded hydrogen atom. Alternatively still, component B) may include both pendent and terminal silicon-bonded hydrogen atoms.

In these embodiments, at a temperature of 25° C., the substantially linear organohydrogenpolysiloxane is typically a flowable liquid or is in the form of an uncured rubber. Generally, the substantially linear organohydrogenpolysiloxane has a viscosity of from 10 to 30,000,000 mPa·s, alternatively from 10 to 10,000,000 mPa·s, alternatively from 100 to 1,000,000 mPa·s, alternatively from 100 to 100,000 mPa·s, at 25° C. Viscosity may be measured at 25° C. via a Brookfield LV DV-E viscometer, as understood in the art.

In certain embodiments, component B) may have one of the following average formulas:

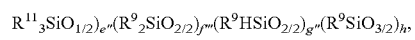

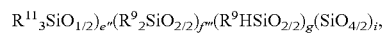

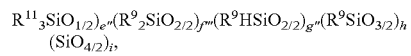

wherein each $R^{11}$ and $R^9$ is independently selected and defined above, e'', f''', and g'' are defined above, and $h \geq 0$, and i is $\geq 0$.

Some of the average formulas above for component B) are resinous when component B) includes T siloxy units (indicated by subscript h) and/or Q siloxy units (indicated by subscript i). When component B) is resinous, component B) is typically a copolymer including T siloxy units and/or Q siloxy units, in combination with M siloxy units and/or D siloxy units. For example, the organohydrogenpolysiloxane resin can be a DT resin, an MT resin, an MDT resin, a DTQ resin, an MTQ resin, an MDTQ resin, a DQ resin, an MQ resin, a DTQ resin, an MTQ resin, or an MDQ resin.

In various embodiments in which component B) is resinous, or comprises an organopolysiloxane resin, component B) typically has the formula:

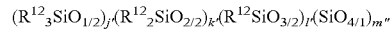

wherein each $R^{12}$ independently is H or a substituted or unsubstituted hydrocarbyl group, with the proviso that in one molecule, at least one $R^{12}$ is H; and wherein $0 \leq j'' \leq 1$; $0 \leq k'' \leq 1$; $0 \leq l'' \leq 1$; and $0 \leq m'' \leq 1$; with the proviso that $j''+k''+l''+m''=1$.

In certain embodiments, component B) may comprise an alkylhydrogen cyclosiloxane or an alkylhydrogen dialkyl cyclosiloxane copolymer, represented in general by the formula $(R^{12}{}_2SiO)_{r'}(R^{12}HSiO)_{s'}$, where $R^{12}$ is independently selected and defined above, and where r' is an integer from 0-7 and s' is an integer from 3-10. Specific examples of suitable organohydrogensiloxanes of this type include $(OSiMeH)_4$, $(OSiMeH)_3(OSiMeC_6H_{13})$, $(OSiMeH)_2(OSiMeC_6H_{13})_2$, and $(OSiMeH)(OSiMeC_6H_{13})_3$, where Me represents methyl ($-CH_3$). Component B) can be a single silicon hydride compound or a combination comprising two or more different silicon hydride compounds.

The composition may comprise components A) and B) in varying amounts or ratios contingent on desired properties of the composition and foams formed therefrom. In various embodiments, the composition comprises components A) and B) in an amount to provide a mole ratio of silicon-bonded hydrogen atoms to aliphatically unsaturated groups of from 0.3 to 5, alternatively from 0.6 to 3.

Component C)

The hydrosilylation (or addition) reaction, e.g. between Si—H and ethylenically unsaturated groups, takes place in the presence of the hydrosilylation catalyst (hereinafter the "catalyst"). The catalyst may be conventional to the art. For example, the catalyst may be a platinum group metal-containing catalyst. By "platinum group" it is meant ruthenium, rhodium, palladium, osmium, iridium and platinum and complexes thereof. Non-limiting examples of catalysts useful herein are described in U.S. Pat. Nos. 3,159,601; 3,220,972; 3,296,291; 3,419,593; 3,516,946; 3,715,334; 3,814,730; 3,923,705; 3,928,629; 3,989,668; 5,036,117; 5,175,325; and 6,605,734.

The catalyst can be platinum metal, platinum metal deposited on a carrier, such as silica gel or powdered charcoal, or a compound or complex of a platinum group metal. Typical catalysts include chloroplatinic acid, either in hexahydrate form or anhydrous form, and/or a platinum-containing catalyst which is obtained by a method comprising reacting chloroplatinic acid with an aliphatically unsaturated organosilicon compound, such as divinyltetramethyldisiloxane, or alkene-platinum-silyl complexes as described in U.S. Pat. No. 6,605,734. An example is: $(COD)Pt(SiMeCl_2)_2$ where "COD" is 1,5-cyclooctadiene. These alkene-platinum-silyl complexes may be prepared, e.g. by mixing 0.015 mole $(COD)PtCl_2$ with 0.045 mole COD and 0.0612 moles $HMeSiCl_2$.

One suitable platinum catalyst type is Karstedt's catalyst, which is described in Karstedt's U.S. Pat. Nos. 3,715,334 and 3,814,730. Karstedt's catalyst is a platinum divinyl tetramethyl disiloxane complex typically containing about 1 wt. % of platinum in a solvent, such as toluene. Another suitable platinum catalyst type is a reaction product of chloroplatinic acid and an organosilicon compound containing terminal aliphatic unsaturation (described in U.S. Pat. No. 3,419,593).

The catalyst is present in the composition in a catalytic amount, i.e., an amount or quantity sufficient to promote a reaction or curing thereof at desired conditions. Varying levels of the catalyst can be used to tailor reaction rate and cure kinetics. The catalytic amount of the catalyst may be greater than 0.01 ppm, and may be greater than 1,000 ppm (e.g., up to 10,000 ppm or more). In certain embodiments, the catalytic amount of catalyst is less than 5,000 ppm, alternatively less than 2,000 ppm, and alternatively less than 1,000 ppm (but in any case greater than 0 ppm). In specific embodiments, the catalytic amount of the catalyst may range from 0.01 to 1,000 ppm, alternatively 0.01 to 100 ppm, and alternatively 0.01 to 50 ppm, of metal based on the weight of the composition. The ranges may relate solely to the metal content within the catalyst or to the catalyst altogether (including its ligands). In certain embodiments, these ranges relate solely to the metal content within the catalyst. The catalyst may be added as a single species or as a mixture of two or more different species.

Component D)

In various embodiments, the chemical blowing agent has at least one OH group, alternatively at least two OH groups, and alternatively three or more OH groups. In certain embodiments, the chemical blowing agent has one or two OH group(s), and alternatively one OH group. The OH group(s) can react with the Si—H groups of component B), thereby generating hydrogen gas, which is useful for reducing density of the foam.

In various embodiments, the chemical blowing agent is selected from the group of low molecular weight alcohols. Examples of low molecular weight alcohols include, but are not limited to, methanol, ethanol, propanol, isopropanol, and the like. In certain embodiments, the chemical blowing agent comprises benzyl alcohol. These and other suitable alcohols can be selected from the group of organic alcohols having from 1 to 12 carbon atoms.

In certain embodiments, the chemical blowing agent is present in an amount to provide a OH content of from about 0.01 to about 250 ppm, alternatively about 0.1 to about 200 ppm, alternatively about 1 to about 150 ppm, alternatively about 10 to about 100 ppm, alternatively about 25 to about 75 ppm, and alternatively about 25 to about 50 ppm. Such amounts are useful for decreasing density of the foam while not generating an excessive amount of hydrogen gas, when such generation is of concern. Higher amounts of the chemical blowing agent can be used in applications where generation of hydrogen gas is of lesser or no concern.

In various embodiments, the chemical blowing agent is a diol. Examples of suitable diols include, but are not limited to, methylene glycol, ethylene glycol, diethylene glycol, propylene glycol, dipropylene glycol, butane diol, bisphenol A, 1,4-butanediol, 1,3-propanediol, 1,5-pentanediol, 1,7-heptanediol, 1,2-hexanediol, triethylene glycol, tripropylene glycol neopentyl glycol, and combinations thereof. In certain embodiments, the diol has the following general formula: $HO-R^7-OH$. In these embodiments, $R^7$ is selected from alkyl, cycloalkyl, alkyl cycloalkyl, aromatic, and alkylaromatic diradicals. Such diradicals generally have up to 50, up to 40, up to 30, up to 20, or up to 10, carbon atoms, or any number of carbon atoms between 1 and 50. The carbon chain which makes up the backbone of the diol may be straight chained or branched. In certain embodiments, the diol may have ether, thio, or amine linkages in its main chain. In specific embodiments, $R^7$ is a hydrocarbylene group having from 1 to 10, 2 to 9, 3 to 8, 4 to 7, 5, or 6, carbon atom(s). In other embodiments, the chemical blowing agent is a triol.

In various embodiments, the chemical blowing agent is selected from the group of low-boiling alcohols. Such alcohols generally have a boiling point lower than about 120° C. The alcohols may or may not be anhydrous, but anhydrous (containing less than 1 wt. %) water based on weight of alcohol is generally preferred. Other suitable blowing agents are described in U.S. Pat. Nos. 4,550,125, 6,476,080, and US20140024731.

In other embodiments, the chemical blowing agent is selected from the group of Si—OH polymers. In certain embodiments, the chemical blowing agent is selected from the group consisting of organosilanes and organosiloxanes having at least one silanol (Si—OH) group. Such compounds can have structures similar to those described above for components A) and B). Examples of suitable OH-functional compounds include dialkyl siloxanes, such as OH-terminated dimethyl siloxanes. Such siloxanes may have a relatively low viscosity, such as about 10 to about 5,000, about 10 to about 2,500, about 10 to about 1,000, about 10 to about 500, or about 10 to about 100, mPa·s. In certain embodiments, such Si—OH polymer is a residue of one of components A) or B).

In various embodiments, the composition is substantially free of OH-functional components other than component D) that facilitate release of hydrogen gas during formation of the foamed silicone elastomer. By substantially free, it is generally meant that the composition includes <5, <4, <3, <2, <1, approaching 0, or 0, wt. % of such OH-functional components.

Component E)

In general, the physical blowing agent is the main source for the gas that leads to the formation of the foam. The chemical blowing agent is generally the secondary source for the gas (hydrogen) that leads to further formation of the foam. In many embodiments, the reaction between the components A) and B) essentially does not lead to the production of gas that leads to or aids in the formation of the foam.

In various embodiments, the physical blowing agent that undergoes a phase change from a liquid to a gaseous state during exposure to atmospheric pressure and a temperature ≥10° C., alternatively ≥20° C., alternatively ≥30° C., alternatively ≥40° C., alternatively ≥50° C., alternatively ≥60° C., alternatively ≥70° C., alternatively ≥80° C., alternatively ≥90° C., alternatively ≥100° C. The boiling point temperature generally depends upon the particular type of physical blowing agent.

The amount of physical blowing agent utilized can vary depending on the desired outcome. For example, the amount of physical blowing agent can be varied to tailor final foam density and foam rise profile.

Useful physical blowing agents include hydrocarbons, such as pentane, hexane, halogenated, more particularly chlorinated and/or fluorinated, hydrocarbons, for example methylene chloride, chloroform, trichloroethane, chlorofluorocarbons, hydrochlorofluorocarbons (HCFCs), ethers, ketones and esters, for example methyl formate, ethyl formate, methyl acetate or ethyl acetate, in liquid form or air, nitrogen or carbon dioxide as gases. In certain embodiments, the physical blowing agent comprises a compound selected from the group consisting of propane, butane, isobutane, isobutene, isopentane, dimethylether or mixtures thereof. In many embodiments, the blowing agent comprises a compound that is inert. These and other suitable physical blowing agents are described in U.S. Pat. Nos. 5,283,003A, 6,476,080B2, 6,599,946B2, EP3135304A1, and WO2018095760A1.

In various embodiments, the physical blowing agent comprises a hydrofluorocarbon (HFC). "Hydrofluorocarbon" and "HFC" are interchangeable terms and refer to an organic compound containing hydrogen, carbon, and fluorine. The compound is substantially free of halogens other than fluorine.

Examples of suitable HFCs include aliphatic compounds such as 1,1,1,3,3-pentafluoropropane (HFC-245fa), 1,1,1,3, 3-pentafluorobutane (HFC-365mfc), 1-fluorobutane, nonafluorocyclopentane, perfluoro-2-methylbutane, 1-fluorohexane, perfluoro-2,3-dimethylbutane, perfluoro-1,2-dimethylcyclobutane, perfluorohexane, perfluoroisohexane, perfluorocyclohexane, perfluoroheptane, perfluoroethylcyclohexane, perfluoro-1,3-dimethyl cyclohexane, and perfluorooctane; as well as aromatic compounds such as fluorobenzene, 1,2-difluorobenzene; 1,4-difluorobenzene, 1,3-difluorobenzene; 1,3,5-trifluorobenzene; 1,2,4,5-tetrafluorobenzene, 1,2,3,5-tetrafluorobenzene, 1,2,3,4-tetrafluorobenzene, pentafluorobenzene, hexafluorobenzene, and 1-fluro-3-(trifluoromethyl)benzene. In certain embodiments, HFC-365mfc and HFC-245fa may be preferred due to their increasing availability and ease of use, with HFC-365mfc having a higher boiling point than HFC-245fa which may be useful in certain applications. For example, HFCs having a boiling point higher than 30° C., such as HFC-365mfc, may be desirable because they do not require liquefaction during foam processing. In specific embodiments, component E) comprises 1,1,1,3,3-pentafluoropropane (HFC-245fa).

Optional Additive(s)

The composition may optionally further comprise additional ingredients or components (or "additives"), especially if the ingredient or component does not prevent the composition from curing and/or foaming. Examples of additional ingredients include, but are not limited to, surfactants; carrier vehicles or solvents; stabilizers; adhesion promoters; colorants, including dyes and pigments; anti-oxidants; carrier vehicles; heat stabilizers; flame retardants; thixotropic agents; flow control additives; inhibitors; fillers, including extending and reinforcing fillers; and cross-linking agents. These and other suitable additives are described in U.S. Pat. No. 4,026,845, WO2014099132, WO2018024858, WO2018024859, and WO2018063849.

One or more of the additives can be present as any suitable weight percent (wt. %) of the composition, such as about 0.1 wt. % to about 15 wt. %, about 0.5 wt. % to about 5 wt. %, or about 0.1 wt. % or less, about 1 wt. %, 2, 3, 4, 5, 6, 7, 8, 9, 10, 11, 12, 13, 14, or about 15 wt. % or more of the composition. One of skill in the art can readily determine a suitable amount of additive depending, for example, on the type of additive and the desired outcome. Certain optional additives are described in greater detail below.

Suitable carrier vehicles include silicones, both linear and cyclic, organic oils, organic solvents and mixtures of these. Specific examples of solvents may be found in U.S. Pat. No. 6,200,581.

The carrier vehicle may also be a low viscosity organopolysiloxane or a volatile methyl siloxane or a volatile ethyl siloxane or a volatile methyl ethyl siloxane having a viscosity at 25° C. in the range of 1 to 1,000 mm$^2$/sec, such as hexamethylcyclotrisiloxane, octamethylcyclotetrasiloxane, ecamethylcyclopentasiloxane, dodecamethylcyclohexasiloxane, octamethyltrisiloxane, decamethyltetrasiloxane, dodecamethylpentasiloxane, tetradecamethylhexasiloxane, exadeamethylheptasiloxane, heptamethyl-3-{(trimethylsilyl)oxy)}trisiloxane, hexamethyl-3,3,bis{(trimethylsilyl) oxy}trisiloxane pentamethyl{(trimethylsilyl) oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

Suitable surfactants (or "foaming aids") include silicone polyethers, ethylene oxide polymers, propylene oxide polymers, copolymers of ethylene oxide and propylene oxide, other non-ionic surfactants, and combinations thereof. Further suitable surfactants may comprise a nonionic surfactant, a cationic surfactant, an anionic surfactant, an amphoteric surfactant, or a mixture of such surfactants.

In various embodiments, the composition comprises a fluorocarbon surfactant or fluorinated surfactant. The fluorinated surfactants can be any of those compounds known in the art which contain fluorine atoms on carbon and are also surfactants. These fluorinated surfactants can be organic or silicon containing. For example, fluorinated organic surfactants can be perfluorinated polyethers such as those which have repeating units of the formulae:

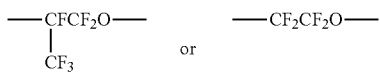

and mixtures of such units.

Silicon-containing fluorinated surfactants can be siloxanes, for example, which contain organic radicals having fluorine bonded thereto, such as siloxanes having repeating units of the formulae:

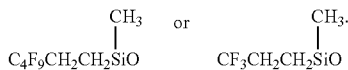

In various embodiments, adding the fluorinated surfactant to the composition decreases the cured foam density. In general, increasing the amount of fluorinated surfactant in the composition decreases the density of the foam. This is especially true for slow cure systems, where the surfactant stabilizes bubbles while the network forms and cures.

In various embodiments, the composition further comprises an organopolysiloxane resin ("resin"). Suitable resins are as describe above. In certain embodiments, the resin is an MQ resin. The resin can be useful for stabilizing the foam.

Suitable pigments are understood in the art. In various embodiments, the composition further comprises carbon black, e.g. acetylene black.

The composition may include one or more fillers. The fillers may be one or more reinforcing fillers, non-reinforcing fillers, or mixtures thereof. Examples of finely divided, reinforcing fillers include high surface area fumed and precipitated silicas including rice hull ash and to a degree calcium carbonate. Examples of finely divided non-reinforcing fillers include crushed quartz, diatomaceous earths, barium sulphate, iron oxide, titanium dioxide and carbon black, talc, and wollastonite. Other fillers which might be used alone or in addition to the above include carbon nanotubes, e.g. multiwall carbon nanotubes aluminite, hollow glass spheres, calcium sulphate (anhydrite), gypsum, calcium sulphate, magnesium carbonate, clays such as kaolin, aluminum trihydroxide, magnesium hydroxide (brucite), graphite, copper carbonate, e.g. malachite, nickel carbonate, e.g. zarachite, barium carbonate, e.g. witherite and/or strontium carbonate e.g. strontianite. Further alternative fillers include aluminum oxide, silicates from the group consisting of olivine group; garnet group; aluminosilicates; ring silicates; chain silicates; and sheet silicates. In certain embodiments, the composition includes at least one filler comprising hollow particles, e.g. hollow spheres. Such fillers can be useful for contributing to porosity and/or overall void fraction of the foam.

The filler if present, may optionally be surface treated with a treating agent. Treating agents and treating methods are understood in the art. The surface treatment of the filler(s) is typically performed, for example with a fatty acid or a fatty acid ester such as a stearate, or with organosilanes, organosiloxanes, or organosilazanes such as hexaalkyi disilazane or short chain siloxane diols. Generally the surface treatment renders the filler(s) hydrophobic and therefore easier to handle and obtain a homogeneous mixture with the other components in the composition. Silanes such as $R^5_e Si(OR^6)_{4-e}$ where $R^5$ is a substituted or unsubstituted monovalent hydrocarbon group of 6 to 20 carbon atoms, for example, alkyl groups such as hexyl, octyl, dodecyl, tetradecyl, hexadecyl, and octadecyl, and aralkyl groups such as benzyl and phenylethyl, $R^6$ is an alkyl group of 1 to 6 carbon atoms, and subscript "e" is equal to 1, 2 or 3, may also be utilized as the treating agent for fillers.

In various embodiments, the composition further comprises a reaction inhibitor. For example, an alkyne alcohol such as 2-methyl-3-butyn-2-ol, 3,5-dimethyl-1-hexyn-3-ol, or 2-phenyl-3-butyn-2-ol; an ene-yne compound such as 3-methyl-3-penten-1-yne or 3,5-dimethyl-3-hexen-1-yne; or 1,3,5,7-tetramethyl-1,3,5,7-tetravinylcyclotetrasiloxane, 1,3,5,7-tetramethyl-1,3,5,7-tetrahexenylcyclotetrasiloxane, or a benzotriazole may be incorporated as an optional component in the composition.

The content of the reaction inhibitor in the composition is not particularly limited. In certain embodiments, the content of the reaction inhibitor is from about 0.0001 to about 5 parts by mass per 100 parts total mass of components (A) and (B). One of skill in the art can readily determine the amount of a particular type of reaction inhibitor (or inhibitors) to make catalysis more latent.

In various embodiments, the composition further comprises an adhesion-imparting agent. The adhesion-imparting agent can improve adhesion of the foam to a base material being contacted during curing. In certain embodiments, the adhesion-imparting agent is selected from organosilicon compounds having at least one alkoxy group bonded to a silicon atom in a molecule. This alkoxy group is exemplified by a methoxy group, an ethoxy group, a propoxy group, a butoxy group, and a methoxyethoxy group. Moreover, non-alkoxy groups bonded to a silicon atom of this organosilicon compound are exemplified by substituted or non-substituted monovalent hydrocarbon groups such as alkyl groups, alkenyl groups, aryl groups, aralkyl groups, halogenated alkyl groups and the like; epoxy group-containing monovalent organic groups such as a 3-glycidoxypropyl group, a 4-glycidoxybutyl group, or similar glycidoxyalkyl groups; a 2-(3,4-epoxycyclohexyl)ethyl group, a 3-(3,4-epoxycyclohexyl)propyl group, or similar epoxycyclohexylalkyl groups; and a 4-oxiranylbutyl group, an 8-oxiranyloctyl group, or similar oxiranylalkyl groups; acrylic group-containing monovalent organic groups such as a 3-methacryloxypropyl group and the like; and a hydrogen atom.

This organosilicon compound generally has a silicon-bonded alkenyl group or silicon-bonded hydrogen atom. Moreover, due to the ability to impart good adhesion with respect to various types of base materials, this organosilicon compound generally has at least one epoxy group-containing monovalent organic group in a molecule. This type of organosilicon compound is exemplified by organosilane compounds, organosiloxane oligomers and alkyl silicates. Molecular structure of the organosiloxane oligomer or alkyl silicate is exemplified by a linear chain structure, partially branched linear chain structure, branched chain structure, ring-shaped structure, and net-shaped structure. A linear chain structure, branched chain structure, and net-shaped structure are typical. This type of organosilicon compound is exemplified by silane compounds such as 3-glycidoxypropyltrimethoxysilane, 2-(3,4-epoxycyclohexyl)-ethyltrimethoxysilane, 3-methacryloxy propyltrimethoxysilane, and the like; siloxane compounds having at least one silicon-bonded alkenyl group or silicon-bonded hydrogen atom, and at least one silicon-bonded alkoxy group in a molecule; mixtures of a silane compound or siloxane compound having at least one silicon-bonded alkoxy group and a siloxane compound having at least one silicon-bonded hydroxyl group and at least one silicon-bonded alkenyl group in the molecule; and methyl polysilicate, ethyl polysilicate, and epoxy group-containing ethyl polysilicate.

The content of the adhesion-imparting agent in the composition is not particularly limited. In certain embodiments, the content of the adhesion-imparting agent is from about 0.01 to about 10 parts by mass per 100 parts total mass of components (A) and (B).

Foam

In many embodiments, the foam is a closed-cell foam. In various embodiments, the foam has a density <0.8 grams per cubic centimeter ($g/cm^3$), alternatively <0.7 $g/cm^3$, alternatively <0.6 $g/cm^3$, alternatively <0.5 $g/cm^3$, alternatively <0.45 $g/cm^3$, alternatively <0.4 $g/cm^3$, alternatively <0.35 $g/cm^3$, alternatively <0.3 $g/cm^3$, alternatively <0.25 $g/cm^3$, alternatively <0.2 $g/cm^3$, alternatively <0.15 $g/cm^3$, alternatively <0.1 $g/cm^3$, and alternatively <0.05 $g/cm^3$.

If density is too high, the foam may be too heavy or stiff for certain applications. If density is too low, the foam may lack desired structural integrity for certain applications. Density of the foam can be determined via methods understood in the art. For example, density of the foam can be measured via the Archimedes principle, using a balance and density kit, and following standard instructions associated with such balances and kits. An example of a suitable balance is a Mettler-Toledo XS205DU balance with density kit.

In various embodiments, the foam has pores that are generally uniform in size and/or shape. In certain embodiments, the foam has an average pore size ≤5 millimeters, alternatively ≤2.5 millimeters, alternatively ≤1 millimeter, alternatively ≤0.5 millimeters, alternatively ≤0.25 millimeters, alternatively ≤0.1 millimeters, and alternatively ≤0.05 millimeters.

Average pore size can be determined via methods understood in the art. For example, ATSM method D3576-15 with the following modifications may be used: (1) image a foam using optical or electron microscopy rather than projecting the image on a screen; and (2) scribe a line of known length that spans greater than 15 cells rather than scribing a 30 mm line.

System

This disclosure also relates to a two-part system for providing the composition (referred to herein as the "system"). The system comprises a first part and a second part. The first part comprises at least component A). The second part comprises at least component B). In various embodiments, the first part further comprises component C) and the second part is free of component C). The parts can be kept separate to prevent premature reaction of the composition, for ease of handling and storage, for ease of formulation, etc. Each of the other components of the composition can be in either of the two parts, both of the two parts, and/or one or more additional parts separate from the two parts (such that the system may be a three- or more part system). In certain embodiments, component E) is added to either side, both sides, and/or added in a separate part. In certain embodiments, a portion of component A) and/or a portion of component B) may be each of the two parts.

Method

This disclosure also relates to a method of forming the foam silicone elastomer. The method comprises the step of combining components A), B), C), D), and E), and optionally along with any other components (e.g. one or more additives), to form the foam. The components can be combined in any order of addition, optionally with a master batch, and optionally under shear.

In various embodiments, the method further comprises the step(s) of: providing the two-part system; and optionally, heating at least one of the two parts. One or more of the parts can be heated to expedite phase change of component E) and/or promote reaction. In further embodiments, component E) and one of the two parts are combined to form a mixture; and the mixture and remaining part are combined to form the foamed silicone elastomer. In the embodiments, the mixture may also be heated as like described above.

When first formed, the composition can have a wide viscosity range. In various embodiments, the composition has a viscosity of from about 1,000 to about 100,000 mPa·s, alternatively about 1,000 to about 50,000 mPa·s, alternatively about 1,000 to about 25,000 mPa·s, alternatively about 1,000 to about 10,000 mPa·s, alternatively about 1,000 to about 7,500 mPa·s, and alternatively about 2,500 to about 5,000 mPa·s. Viscosity can be determined via methods understood in the art.

This disclosure also relates to use of the composition, the system, or the foam, for at least partially covering or encapsulating an article, and/or for thermal insulation, and/or as a fire block. Exemplary articles are described below, and this disclosure is not limited to a particular one.

INDUSTRIAL APPLICABILITY

The compositions, foams, and methods of this disclosure are useful for a variety of end applications, and are not limited to a particular one. Examples of suitable applications include space filling applications, automotive applications (e.g. for control modules), and the like. The foams can be used to at least partially cover or encapsulate articles, such as batteries and other electronic components. The foams can also be used for thermal insulation. Moreover, the foams can be used as a fire block. In general, the foams of this disclosure provide a combination of desirable physical properties relative to conventional foams, including one or more of the following: reduced weight, lowered density, increased thermal resistance, increased stability, etc. The foams can be formed in environments where the formation of hydrogen gas is a concern. In addition, the foams can be foamed at room temperature or thereabout, which is useful for temperature sensitive applications.

The following examples, illustrating the compositions, foams, and methods, are intended to illustrate and not to limit the invention.

EXAMPLES

As introduced above, it was initially discovered that excluding a majority to all of the hydroxyl-functional components of the composition, and blending component E) (e.g. HFC-245fa) produced a foam, at room temperature, with desirable densities (e.g. a density as low as 0.3 $g/cm^3$) with reasonable pore size and pore size distribution. Surprisingly, however, inclusion of a small amount of component D) (e.g. benzyl alcohol; 25 ppm OH active group) significantly decreased the density of the final foam, while producing only a minimum quantity of hydrogen gas ($H_2$). Referring to FIG. 1, the foam rise profile for a sample containing no added OH is shown in dark green; it had a final density of ~0.5 g/cm$^3$. Based on calculations, 25 ppm OH was expected to generate $H_2$ to a final concentration below the LEL of hydrogen gas in air, or ~5%, assuming all of the $H_2$ was captured inside the foam. Despite the relatively small volume of $H_2$ expected to be generated, the foam height of the 25 ppm sample was much higher, producing a final density of ~0.34 g/cm$^3$. Further increase in OH to 100 ppm dropped the density to ~0.29 g/cm$^3$. While this is technically higher than the tolerable $H_2$ generation to remain below the LEL, it is expected that some quantity of $H_2$ will escape during foaming, such that an explosive gas composition is never produced.

To confirm these initial findings, additional compositions were generated utilizing different types and amounts of components. These are detailed below. All amounts are in parts by weight unless indicated otherwise.

Components

Organopolysiloxane A1) is dimethyl siloxane, dimethylvinylsiloxy-terminated, having a viscosity of ~430 mPa·s and ~0.46 wt. % Vi.

Organopolysiloxane A2) is dimethyl siloxane, dimethylvinylsiloxy-terminated, having a viscosity of ~39,000 mPa·s and ~0.08 wt. % Vi.

Organopolysiloxane A3) is a blend of Organopolysiloxane A2) and a $^{vi}$MMQ resin, having a viscosity of ~45,000 mPa·s and ~0.39 wt. % Vi.

Organohydrogensiloxane B1) is methylhydrogen siloxane, trimethylsiloxy-terminated, having a viscosity of ~30 mPa·s and ~1.6 wt. % SiH.

Organohydrogensiloxane B2) is dimethyl, methylhydrogen siloxane, trimethylsiloxy-terminated, having a viscosity of ~5 mPa·s and ~0.76 wt. % SiH.

Catalyst C1) is dimethyl siloxane, dimethylvinylsiloxy-terminated; dimethyl siloxane, dimethylvinylsiloxy-terminated; 1,3-diethenyl-1,1,3,3-tetramethyldisiloxane complexes (platinum), having ~2.11 wt. % Vi.

Chemical Blowing Agent D1) is benzyl alcohol, having ~15.72 wt. % OH.

Chemical Blowing Agent D2) is isopropanol, having ~28.29 wt. % OH.

Chemical Blowing Agent D3) is dimethyl siloxane, hydroxy-terminated, having a viscosity of ~40 mPa·s and ~3.67 wt. % OH.

Physical Blowing Agent E1) is HFC-245fa.

Physical Blowing Agent E2) is methylene chloride.

Surfactant 1 is dimethyl siloxane, trimethylsiloxy-terminated; 407 type resin with 2-(perfluorohexyl) ethyl alcohol, having a viscosity of ~350 mPa·s.

Pigment 1 is a slurry of dimethyl siloxane, dimethylvinylsiloxy-terminated; zinc oxide; carbon black, having a viscosity of 350 mPa·s and ~0.46 wt. % Vi.

Filler 1 is fine ground silica (quartz), 5 micron.

Inhibitor 1 is tetramethyltetravinylcyclotetrasiloxane, having a viscosity of ~3 mPa·s and ~31.40 wt. % Vi.

Inhibitor 2 is methylvinyl siloxane, hydroxy-terminated; methylvinyl cyclosiloxanes, having a viscosity of ~32 mPa·s and ~29.75 wt. % Vi.

OH-Functional Siloxane 1 is dimethyl siloxane, hydroxy-terminated, having a viscosity of ~13,500 mPa·s and ~0.05 wt. % OH.

OH-Functional Siloxane 2 is dimethyl siloxane, hydroxy-terminated, having a viscosity of ~470 mPa·s and ~0.10 wt. % OH.

OH-Functional Siloxane 3 is the same as Chemical Blowing Agent D3).

Tables 1 and 2 below include comparative and inventive compositions. In general, components of each Side A and Side B are blended separately in a Flakteck SpeedMixer™ (which is a dual asymmetric centrifugal mixer) for 1 minute at 2500 rpm. The parts are then used to form foams as described further below.

Comparative Example ("CE") No. 1 illustrates use of component E) but not D).

CE No. 2 illustrates use of component D) but not E).

CE No. 3 illustrates no component D) or E).

CE No. 4 illustrates a conventional hydrogen gas blown RTV silicone foam.

CE No. 5 is similar to CE No. 1, but using an alternate type of component E).

Inventive Example ("IE") No. 1 illustrates component D) imparting 25 ppm OH in combination with component E).

IE No. 2 illustrates component D) imparting 100 ppm OH in combination with component E).

IE No. 3 illustrates component D) imparting 200 ppm OH in combination with component E)

IE No. 4 is essentially a repeat of IE No. 2.

IE No. 5 is similar to IE No. 4, but using an alternate type of component D).

IE No. 6 is similar to IE No. 4, but using an alternate type of component D).

IE No. 7 is similar to IE No. 4, but using an alternate type of component E).

TABLE 1-A

| Comp. Components | Comparative Example No. | | | | |
|---|---|---|---|---|---|
| Part A | 1 | 2 | 3 | 4 | 5 |
| Organopolysiloxane A1) | 59 | 59 | 59 | — | 59 |
| Organopolysiloxane A2) | 23 | 23 | 23 | — | 23 |
| OH-Functional Siloxane 1 | — | — | — | 15.81 | — |
| OH-Functional Siloxane 2 | — | — | — | 42.26 | — |
| OH-Functional Siloxane 3 | — | — | — | 12.40 | — |
| Surfactant 1 | 12 | 12 | 12 | 8 | 12 |
| Pigment 1 | 5.75 | 5.75 | 5.75 | 5.97 | 5.75 |
| Catalyst C1) | 0.25 | 0.25 | 0.25 | 0.46 | 0.25 |
| Chemical Blowing Agent D1) | — | 1.08 | — | 2.50 | — |
| Filler 1 | — | — | — | 12.60 | — |
| Total | 100 | 101.08 | 100 | 100 | 100 |

TABLE 1-B

| Comp. Components | Comparative Example No. | | | | |
|---|---|---|---|---|---|
| Part B | 1 | 2 | 3 | 4 | 5 |
| Organopolysiloxane A1) | 64.8 | 64.8 | 64.8 | 40.4 | 64.8 |
| OH-Functional Siloxane 1 | — | — | — | 34.86 | — |
| Organopolysiloxane A3) | 32 | 32 | 32 | — | 32 |
| Organohydrogensiloxane B1) | 3.00 | 3.00 | 3.00 | 9.65 | 3.00 |
| Organohydrogensiloxane B2) | — | — | — | 2.27 | — |
| Inhibitor 1 | 0.2 | 0.2 | 0.2 | 0.2 | — |
| Inhibitor 2 | — | — | — | 0.02 | — |
| Filler 1 | — | — | — | 12.60 | — |
| Total | 100 | 100 | 100 | 100 | 99.8 |

TABLE 2-A

| Comp. Components | Inventive Example No. | | | | | | |
|---|---|---|---|---|---|---|---|
| Part A | 1 | 2 | 3 | 4 | 5 | 6 | 7 |
| Organopolysiloxane A1) | 59 | 59 | 59 | 57.9 | 58.4 | 54.4 | 59 |
| Organopolysiloxane A2) | 23 | 23 | 23 | 23 | 23 | 23 | 23 |
| Surfactant 1 | 12 | 12 | 12 | 12 | 12 | 12 | 12 |
| Pigment 1 | 5.75 | 5.75 | 5.75 | 5.75 | 5.75 | 5.75 | 5.75 |
| Catalyst C1) | 0.25 | 0.25 | 0.25 | 0.25 | 0.25 | 0.25 | 0.25 |
| Chemical Blowing Agent D1) | 0.27 | 1.08 | 2.16 | 1.08 | — | — | 1.08 |
| Chemical Blowing Agent D2) | — | — | — | — | 0.6 | — | — |
| Chemical Blowing Agent D3) | — | — | — | — | — | 4.65 | — |
| Total | 100.3 | 101.1 | 102.2 | 100 | 100 | 100 | 101.1 |

TABLE 2-B

| Comp. Components | Inventive Example No. | | | | | | |
|---|---|---|---|---|---|---|---|
| Part B | 1 | 2 | 3 | 4 | 5 | 6 | 7 |
| Organopolysiloxane A1) | 64.8 | 64.8 | 64.8 | 64.8 | 64.8 | 64.8 | 64.8 |
| Organopolysiloxane A3) | 32 | 32 | 32 | 32 | 32 | 32 | 32 |
| Organohydrogensiloxane B1) | 3 | 3 | 3 | 3 | 3 | 3 | 3 |
| Inhibitor 1 | 0.2 | 0.2 | 0.2 | 0.2 | 0.2 | 0.2 | — |
| Total | 100 | 100 | 100 | 100 | 100 | 100 | 99.8 |

Tables 3 and 4 further below include comparative and inventive compositions. For those examples using HFC-245fa, 20 grams of B-side was weighed into a plastic cup. Next, an excess of HFC-245fa (~5 grams) was added and mixed via the Flakteck SpeedMixer™ for 15 seconds at 2500 rpm. The mixture is then placed on a balance and monitored until weight of the added HFC-245fa drops to 4.2 grams. Next, 20 grams of A-side is added, and the reaction mixture is hand mixed vigorously with a spatula for 30 seconds, at which point the weight of the added HFC-245fa is 3.2 grams. Collection of foam height data using Foamat equipment is started.

For those examples using methylene chloride, the procedure above is essentially the same. However, due to methylene chloride having a higher boiling point relative to HFC-245fa, preheating was required. Specifically, the A-side was preheated to 45° C. while the B-side remained at room temperature. After the parts were combined, the reaction mixture was held in a water bath at 60° C. while foaming, at which point the reaction mixture slowly increased from ~40° C. to ~50° C. over the course of the experiment.

Foam density can be determined via a balance as described above.

Hydrogen gas generation can be determined using the following equation:

$$\frac{\text{mol } H_2 \text{ generated}}{\text{kg emulsion}} = \text{ppm} H \times \frac{10^{-6} \text{g} H}{\text{g emulsion}} \times \frac{1 \text{ mol} H}{1.01 \text{ g} H} \times \frac{1 \text{ mol } H_2 \text{ generated}}{1 \text{ mol} H} \times \frac{1000 \text{ g emulsion}}{1 \text{ kg emulsion}}$$

TABLE 3

| | Comparative Example No. | | | | |
|---|---|---|---|---|---|
| Foam Components | 1 | 2 | 3 | 4 | 5 |
| Part A (g) | 20 | 20 | 20 | 20 | 20 |
| Part B (g) | 20 | 20 | 20 | 20 | 20 |
| Physical Blowing Agent E1) (g) | 3.2 | — | — | — | — |
| Physical Blowing Agent E2) (g) | — | — | — | — | 3.2 |
| Foam Properties | | | | | |
| Foam Density (cm³) | 0.50 | 0.97 | 0.98 | 0.33 | 0.78 |
| Hydrogen gas generation potential (mole/kg) | 0 | 0.01 | 0 | 0.20 | 0 |
| ppm SiH | 0.00 | 480 | 0.00 | 1694.12 | 0 |
| SiH wt. % | 0 | 3 | 0 | 11.78 | 0 |

TABLE 4

| | Inventive Example No. | | | | | | |
|---|---|---|---|---|---|---|---|
| Foam Components | 1 | 2 | 3 | 4 | 5 | 6 | 7 |
| Part A (g) | 20 | 20 | 20 | 20 | 20 | 20 | 20 |
| Part B (g) | 20 | 20 | 20 | 20 | 20 | 20 | 20 |
| Physical Blowing Agent E1) (g) | 3.2 | 3.2 | 3.2 | 3.2 | 3.2 | 3.2 | — |
| Physical Blowing Agent E2) (g) | — | — | — | — | — | — | 3.2 |

TABLE 4-continued

| Foam Components | Inventive Example No. | | | | | | |
|---|---|---|---|---|---|---|---|
| | 1 | 2 | 3 | 4 | 5 | 6 | 7 |
| Foam Properties | | | | | | | |
| Foam Density (g/cm$^3$) | 0.34 | 0.30 | 0.29 | 0.34 | 0.33 | 0.40 | 0.49 |
| Hydrogen gas generation potential (mole/kg) | 0.01 | 0.01 | 0.01 | 0.01 | 0.01 | 0.01 | 0.01 |
| ppm SiH | 480 | 480 | 480 | 480 | 480 | 480 | 480 |
| SiH wt. % | 3.00 | 3.00 | 3.00 | 3.00 | 3.00 | 3.00 | 3.00 |

CE Nos. 1 through 3, along with IE No. 2, show the surprising synergistic effect of adding a small amount of chemical blowing agent to a formulation which is primarily blown using a physical blowing agent. CE No. 3 demonstrates the density expected when neither chemical nor physical blowing agents are used in the formulation. The solid elastomer which is produced has a density of 0.98 g/cm$^3$. CE Nos. 1 and 2 demonstrate the effects of using respectively, only physical or only chemical blowing agent. In CE No. 1, 3.2 g of HFC-245fa physical blowing agent produces a foam density of 0.5 g/cm$^3$, a significant reduction of 0.48 g/cm$^3$ from the elastomer density of 0.98 g/cm$^3$. In CE No. 2, 100 ppm OH from benzyl alcohol chemical blowing agent produces a foam density of 0.97 g/cm$^3$, a barely noticeable reduction of 0.01 g/cm$^3$ from the elastomer density of 0.98 g/cm$^3$. Given these results from chemical and physical blowing agents alone, the significant additional density reduction shown in at least IE No. 2 is surprising. This inventive example combines the 3.2 g HFC-245fa blowing agent from CE No. 1 with the 100 ppm OH from CE No. 2. The resulting density of 0.30 g/cm$^3$ represents a reduction of 0.68 g/cm$^3$ from the elastomer, much larger than the individual reductions of 0.48 g/cm$^3$ from physical and 0.01 g/cm$^3$ from the chemical blowing agents would imply.

Taken together, IE Nos. 1 through 3 demonstrate that this density reduction extends across a range of added OH, from 25 ppm to 200 ppm. IE Nos. 4 through 6 demonstrate that this density reduction extends to a wide range of OH providers.

CE No. 5 and IE No. 7 demonstrate that the effect of added OH is not confined to use with the physical blowing agent HFC-245fa. These examples were produced using methylene chloride, a physical blowing agent with low global warming potential (GWP). In CE No. 5, the density using only the physical blowing agent is 0.78 g/cm$^3$, which represents a reduction of 0.2 g/cm$^3$ from the elastomer density of 0.98 g/cm$^3$ in CE No. 3.

CE No. 2 shows the density reduction from the chemical blowing agent which was used, 100 ppm OH from benzyl alcohol, was a barely noticeable 0.01 g/cm$^3$. IE No. 7, from the combined physical and chemical blowing agents, has a density of 0.49 g/cm$^3$, representing a reduction of 0.49 g/cm$^3$ from the elastomer density of 0.98 g/cm$^3$. This is again much greater than the individual reductions of 0.2 g/cm$^3$ from the physical and 0.01 g/cm$^3$ from the chemical blowing agent would imply.

As shown in Tables 3 and 4 above, utilizing a combination of components D) and E) provides for excellent physical properties of the foams, including low density and low hydrogen gas generation. While low density can be achieved in CE No. 4, the potential for generation of hydrogen gas is orders of magnitude higher relative to the inventive examples. Again, FIG. 1 illustrates foam rise with varying levels of OH, where 0 ppm is CE No. 1, 25 ppm is IE No. 1, 100 ppm is IE No. 2, and 200 ppm is IE No. 3.

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A composition for forming a foamed silicone elastomer, said composition comprising:
    A) an organopolysiloxane having at least two silicon-bonded ethylenically unsaturated groups per molecule;
    B) an organohydrogensiloxane having at least two silicon-bonded hydrogen atoms per molecule;
    C) a hydrosilylation catalyst present in a catalytically effective amount;
    D) a chemical blowing agent having at least one hydroxyl (OH) group and present in an amount to provide the composition with a OH content greater than zero (>0) and less than 500 (<500) parts per million (ppm); and
    E) a physical blowing agent that undergoes a phase change from a liquid to a gaseous state during exposure to atmospheric pressure and a temperature ≥0° C.

2. The composition as set forth in claim 1, wherein component D) is selected from the group consisting of organic alcohols having from 1 to 12 carbon atoms.

3. The composition as set forth in claim 2, wherein component D) comprises benzyl alcohol.

4. The composition as set forth in claim 1, wherein component D) is selected from the group consisting of organosilanes and organosiloxanes having at least one silanol (Si—OH) group.

5. The composition as set forth in claim 1, wherein the OH content provided to the composition by component D) is from about 10 to about 250 ppm.

6. The composition as set forth in claim 1, wherein component E) comprises a hydrofluorocarbon (HFC).

7. The composition as set forth in claim 6, wherein component E) comprises 1,1,1,3,3-pentafluoropropane (HFC-245fa).

8. The composition as set forth in claim 1, wherein:
    i) component A) comprises an alkenyl functional polydialkylsiloxane fluid; and/or
    ii) component B) comprises a polyakylhydrogensiloxane fluid.

9. The composition as set forth in claim 1, further comprising at least one additive selected from the group consisting of surfactants, organopolysiloxane resins, fillers, reaction inhibitors, colorants, and combinations thereof.

10. A two-part system for providing the composition according to claim 1, said two-part system comprising a first part having at least component A) and a second part having at least component B), optionally wherein the first part further comprises component C) and the second part is free of component C).

11. A foamed silicone elastomer, said foamed silicone elastomer comprising the reaction product of the composition according to claim 1.

12. The foamed silicone elastomer as set forth in claim 11, having:
    i) a density less than 0.8 (<0.8) grams per cubic centimeter (g/cm$^3$); and/or
    ii) an average pore size less than or equal to 5 (≤5) millimeters.

13. A method of forming the foamed silicone elastomer of claim 11, said method comprising the step of combining components A), B), C), D), and E) to form the foamed silicone elastomer.

14. The method according to claim 13, further comprising the step(s) of:
    providing a two-part system comprising a first part having at least component A) and a second part having at least component B), optionally wherein the first part further comprises component C) and the second part is free of component C);
    optionally, heating at least one of the two parts; and
    wherein the step of combining is further defined as:
    combining component E) and one of the two parts to form a mixture; and
    combining the mixture and remaining part to form the foamed silicone elastomer.

15. The composition as set forth in claim 2, wherein component E) comprises a hydrofluorocarbon (HFC).

16. The composition as set forth in claim 3, wherein component E) comprises 1,1,1,3,3-pentafluoropropane (HFC-245fa).

17. The composition as set forth in claim 2, wherein the OH content provided to the composition by component D) is from about 10 to about 250 ppm.

18. The composition as set forth in claim 4, wherein the OH content provided to the composition by component D) is from about 10 to about 250 ppm.

19. The composition as set forth in claim 8, where:
    i) component A) comprises an alkenyl functional polydialkylsiloxane fluid; and
    ii) component B) comprises a polyakylhydrogensiloxane fluid.

* * * * *